(12) United States Patent
Viaud

(10) Patent No.: US 8,733,242 B2
(45) Date of Patent: May 27, 2014

(54) COMBINATION AGRICULTURAL APPARATUS AND TOWING VEHICLE WITH A SAFETY FEATURE

(75) Inventor: Jean Viaud, Reyssouze (FR)

(73) Assignee: Deere & Company, Moline, IL (US)

( * ) Notice: Subject to any disclaimer, the term of this patent is extended or adjusted under 35 U.S.C. 154(b) by 328 days.

(21) Appl. No.: 12/875,476

(22) Filed: Sep. 3, 2010

(65) Prior Publication Data

US 2011/0209631 A1 Sep. 1, 2011

(30) Foreign Application Priority Data

Sep. 25, 2009 (DE) .......................... 10 2009 045 044

(51) Int. Cl.
*F16P 3/12* (2006.01)
*B30B 9/30* (2006.01)

(52) U.S. Cl.
USPC ................................ 100/348; 100/48; 100/88

(58) Field of Classification Search
USPC ........... 100/8, 88, 87, 348, 43, 48, 99; 56/341
See application file for complete search history.

(56) References Cited

U.S. PATENT DOCUMENTS

| | | | |
|---|---|---|---|
| 3,805,497 A | | 4/1974 | Ross |
| 4,323,136 A | * | 4/1982 | van der Lely et al. ......... 180/271 |
| 7,404,355 B2 | * | 7/2008 | Viaud et al. ........................ 100/4 |
| 2009/0107102 A1 | * | 4/2009 | Biziorek ........................ 56/341 |

FOREIGN PATENT DOCUMENTS

| | | |
|---|---|---|
| DE | 4031590 | 12/1991 |
| DE | 4309668 | 9/1994 |
| DE | 19608014 | 9/1997 |
| DE | 19718110 | 11/1998 |
| DE | 10244822 | 4/2004 |
| DE | 102008018541 | 10/2009 |
| EP | 1813146 | 8/2007 |
| EP | 2106688 | 10/2009 |
| GB | 2206662 | 1/1989 |

OTHER PUBLICATIONS

European Search Report, Oct. 5, 2011, 3 pages.

* cited by examiner

*Primary Examiner* — Jimmy T Nguyen
(74) *Attorney, Agent, or Firm* — Quarles & Brady LLP

(57) ABSTRACT

A hauling or towing vehicle has a power take-off shaft that can be activated and deactivated selectively by way of a coupling. The apparatus has drivable elements that can be connected to the power take-off shaft. An electronic control unit of the apparatus is connected via a bus to an electronic control unit of the hauling or towing vehicle. The electronic control unit of the apparatus is connected to a sensor for detecting a living creature present in a danger zone of the machine. In the case that a living creature is detected in the danger zone, the electronic control unit of the apparatus causes the electronic control unit of the hauling or towing vehicle to order an actuator to disconnect the coupling of the power take-off shaft and/or to prevent the actuator from closing the coupling.

5 Claims, 1 Drawing Sheet

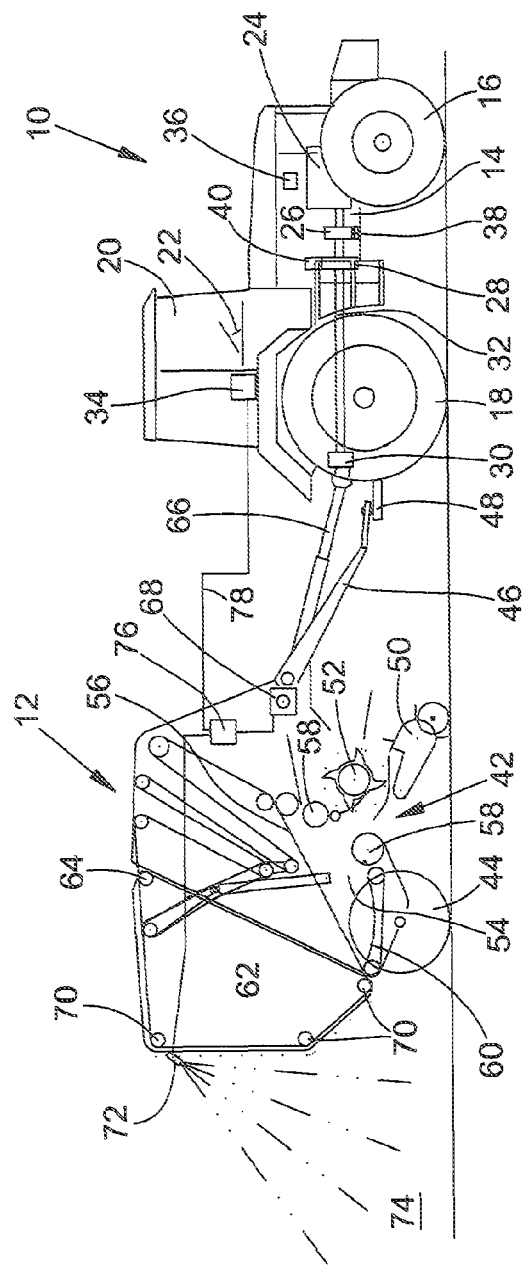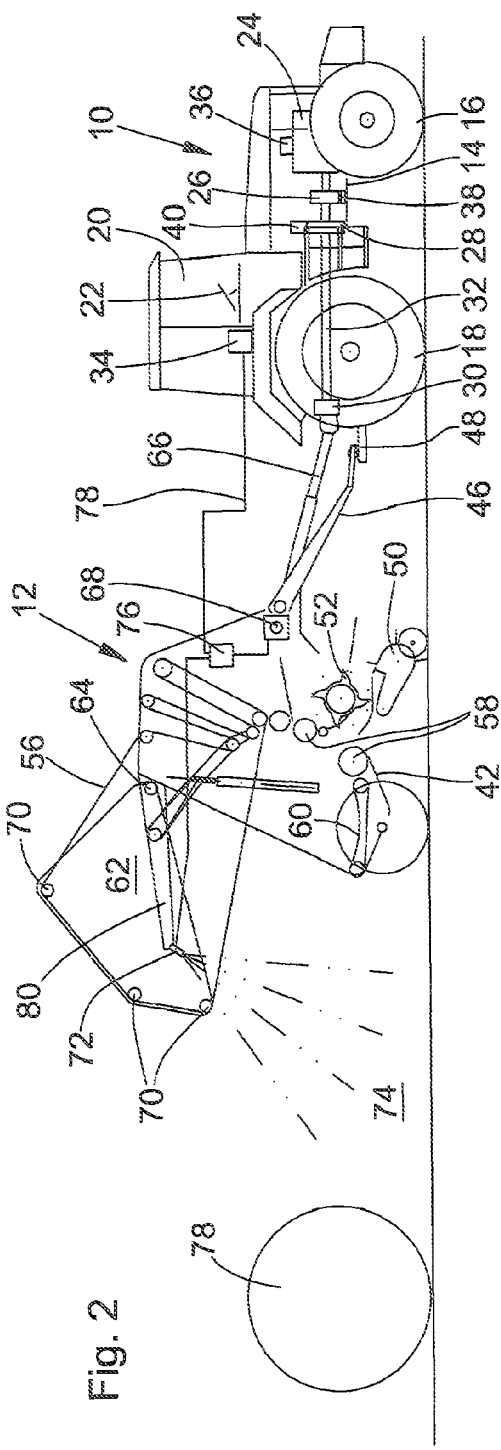

COMBINATION AGRICULTURAL APPARATUS AND TOWING VEHICLE WITH A SAFETY FEATURE

FIELD OF THE INVENTION

The invention relates to a combination agricultural apparatus and a hauling or towing vehicle, wherein the hauling or towing vehicle has a power take-off (PTO) shaft that can be activated/deactivated selectively by means of a coupling. The agricultural apparatus has drivable elements that can be connected to the PTO shaft. An electronic control unit of the agricultural apparatus is connected via a bus to an electronic control unit of the hauling or towing vehicle, and the electronic control unit of the hauling or towing vehicle is connected to an external-power-activated actuator for activating/deactivating the coupling of the PTO shaft.

BACKGROUND OF THE INVENTION

In the case of agricultural apparatuses, moving elements are typically covered covers for safety reasons, in order to protect the operator and other persons. However, because the interior of the apparatus must be accessible for inspection and maintenance purposes, the covers are typically mounted on the apparatus so that they can be removed or pivoted. In order to prevent accidents, the covers are usually opened only by using appropriate tools, which has the disadvantage that they cannot be opened without the appropriate tool. If these tools are not available, work on the apparatus is not possible. It has been proposed to automatically turn off the internal combustion engine of a self-propelled agricultural work machine when a sensor detects that a cover of the work machine has been opened (see e.g. German Patent Document DE 43 09 668 A). An arrangement for detecting an opened cover of a baler, which optionally leads to the PTO shaft of the tractor being deactivated, is described in the subsequently published German Patent Document DE 10 2008 018 541 A1.

In the case of covers, it is considered disadvantageous that they are basically unnecessary for the operation of the apparatus operated by the tractor, but instead only increase the weight and the production costs. In many cases, they are disassembled by the operators in order to make working on the apparatus easier. In addition, despite the presence of covers, 100% protection of the operator is not possible, because, for example, the openings through which the apparatus takes in harvested material (in the case of a bale press, the crop pick-up and the rotor arranged downstream) cannot be covered, because if they were, harvested material could not be fed. Even in this section, however, sometimes there are blockages. Operators often attempt to eliminate these blockages while the apparatus is running, which puts them in great danger.

In British Patent document GB 2 206 662 A, a baler with an emergency stop device is described that can be actively controlled by an operator if he finds himself in a dangerous situation when working on the baler, for example, when clearing a blockage. Nevertheless, this emergency stop device cannot prevent the operator from being injured.

Furthermore, it has been proposed to mount an infrared sensor for detecting the heat of living creatures, motors, etc., on a self-propelled baler, wherein this sensor leads to the deactivation of the baler (see e.g. German Patent Document DE 196 08 014 A1). It has been proposed analogously for an unmanned combine harvester to mount a sensor in a danger zone, wherein this sensor detects living creatures and optionally stops the combine harvester (see e.g. German Patent Document DE 102 44 822 A1). The subsequently published European Patent Application EP 2 106 688 A1 describes a baler that is pulled behind a tractor and whose baling speed is reduced when a sensor detects an obstacle in the direct vicinity of the baler.

European Patent Application EP 1 813 146 A2, viewed as a class-forming patent, describes a combination made from a tractor and a baler, each of which is equipped with an electronic control unit. The control units communicate with each other via a bus, so that the control unit of the baler can instruct the control unit of the tractor to stop the tractor for purposes of wrapping and ejecting a bale. Before starting a baling process, the control of the baler causes the PTO shaft of the tractor to be put in rotation.

The problem forming the basis of the invention is seen in the need for a combination made from an agricultural apparatus and a hauling or towing vehicle in which accidents are prevented or at least made less likely without great expense.

SUMMARY OF THE INVENTION

A combination is assembled from an agricultural apparatus and a hauling or towing vehicle that can carry, pull, or in some other way move the apparatus across a field. The hauling or towing vehicle has an electronic control unit that connects to an actuator with which a coupling for a power take-off (PTO) shaft can be selectively activated/deactivated. The apparatus has, in turn, drivable elements that can be driven by the PTO. In addition, the apparatus has an electronic control unit that is allocated to it and that connects to a sensor detecting whether a person or another living creature or obstacle is located within a danger zone of the apparatus. The danger zone usually involves a predetermined area adjacent to the apparatus. The two control units communicate with each other via a bus connection that can be one or more of a wired, optical-fiber, or wireless connection, e.g., by radio or light waves. The bus connection can be equipped, in particular, according to the ISO 11783 standard. If the sensor of the electronic control unit of the apparatus reports that a person or the like is located within the monitored danger zone, then the electronic control unit of the apparatus transmits the instruction to the electronic control unit of the hauling or towing vehicle to cause the actuator to open the coupling of the PTO shaft, in order to eliminate the danger to the operator or to other persons or animals located in the vicinity. If the coupling of the PTO shaft is not yet closed when the cover is opened, then the electronic control unit of the hauling or towing vehicle prevents the actuator from causing the closing of the coupling, even when an operator activates the PTO shaft switch. In both cases, a warning is advantageously given to the operator.

Because stopping or preventing the starting of the PTO shaft involves only components that are usually already present (with the exception of the sensor), this arrangement produces an automatic stoppage of the moving elements of the apparatus in order to prevent the risk of an accident when a person is located in the vicinity of the apparatus without large additional costs. Thus safety conditions can also be satisfied with apparatuses for which covers are completely or partially omitted. In addition, work on the apparatus is made easier when covers are eliminated.

The invention can be used on any agricultural apparatus that has elements driven by a PTO shaft. Examples are balers or round or rectangular bales, trucks, earth-working machines, mowing apparatuses, and built-on or towed field choppers. For the case of a round-baler, for example, the rear door or moving covers provided instead of the door can be eliminated. Then the sensor monitors the rear section of the round-baler. It is also conceivable to allow the elimination of the side and/or front covers of the apparatus, for example, of a bale press for round or rectangular bales, and also to monitor the sides and/or front side of the apparatus by the sensor.

The sensor can be constructed as an infrared sensor that detects persons and living creatures with reference to the infrared waves emitted by them. Through suitable data processing it can be prevented that bales ejected from a bale press lead to faulty activation due to the bales being heated by friction on the side walls of the bale press. For this purpose, the electronic control unit of the apparatus or a suitable circuit allocated to the sensor can be informed on the ejection of the bale. A response of the sensor in time correlation with the ejection of the bale is then ignored. In an additional or different embodiment, the sensor comprises a camera working in two or three dimensions and an image-processing system.

The size of the sensitive area of the sensor advantageously depends on the speed at which the combination is moving across a field. At higher speeds, it is less likely that a person or an animal will approach the apparatus and touch driven elements than when it is moving relatively slowly or when it is stopped. Therefore, it is provided to form a relatively large sensitive area at low speeds or at standstill, in order to avoid accidents in this especially dangerous situation, and to form a smaller sensitive area at higher speeds (e.g., above 5 km/h) or to then completely deactivate the sensor. This arrangement also reduces the likelihood of faulty activation of the sensor due to, for example, low-hanging branches, fencing, or other obstacles

BRIEF DESCRIPTION OF THE DRAWINGS

The embodiments of the invention are described in detail below with reference to the accompanying drawings wherein:

FIG. 1 is a schematic side view of a combination made from a towing vehicle in the form of a tractor and an apparatus in the form of a round agricultural baler during the formation of a bale; and, FIG. 2 is the combination of FIG. 1 during the ejection of a bale.

DESCRIPTION OF THE PREFERRED EMBODIMENT

In FIGS. 1 and 2 combination of a towing vehicle 10 in the form of a tractor and an apparatus 12 in the form of a round-bale press is illustrated. The towing vehicle 10 comprises a chassis 14 that is equipped with a frame and that is supported on the ground by front, steerable wheels 16 and rear, drivable wheels 18. A cabin 20 with an operator work space, in which a seat (not shown) and a steering wheel 22 are arranged, and an internal combustion engine 24 are mounted on the chassis 14. The crankshaft of the internal combustion engine 24 is connected via a coupling 26 to a power take-off (PTO) shaft transmission 28 that drives, in turn, a PTO shaft output 30 via a PTO shaft 32. An electronic control unit 34 is connected electrically to a motor controller 36 that inspects and controls operating parameters of the internal combustion engine 24 and to an external-power-activated actuator 38 that can open and close the coupling 26, and that is actuated, for example, electrically or hydraulically. The electronic control unit 34 is also, connected to an actuator 40 with which the transmission ratio and thus the output rotational speed of the PTO shaft transmission 28 can be selected. The internal combustion engine 24 also drives the wheels 18 and optionally 16 by means of another transmission (not shown).

The apparatus 12 comprises a chassis 42 that is supported on the ground by wheels 44 and is connected by means of drawbar 46 to a drawbar coupling 48 of the towing vehicle 10. The apparatus 12 further comprises a material pick-up 50 that feeds harvested material lying on the field through an upper shaft and to a rotor 52 that feeds it into a baling chamber 54. The baling chamber 54 is enclosed toward the top by baling elements 56 in the form of belts and toward the bottom by rollers 58 and optionally by an additional belt 60. In the rear section of the apparatus 12 there is a gate 62 that can pivot backward and upward and that is hinged on the top side of the chassis 42 about an axis 64 running horizontally and perpendicular to the forward direction for ejecting a finished bale. The gate 62 holds rollers 70 about which the baling elements 56 revolve. The gate 62 covers the baling elements 56 only at the side, but not toward the back. However, the apparatus 12 has side, front, and top covers that are partially omitted from the figures for reasons of clarity. The rollers 58, rollers for driving the baling elements 56 and the belt 60, the rotor 52 and the material pick-up 50 are in driven connection with the PTO shaft output 30 via a drive shaft 66 and a transmission 68. Such balers or similar balers in which the present invention can be applied are described in U.S. Pat. No. 3,964,246 A, German Patent Document DE 102 50 425 A1, European Patent Application EP 1 512 320 A2, and the subsequently published German Patent Document DE 10 2009 002 585 A1, whose disclosures are incorporated herein by reference.

On the apparatus 12, in the upper, rear section, a sensor 72 is allocated that is constructed as an infrared sensor or a camera with an image-processing system that monitors a danger zone 74 with a defined size located behind the apparatus 12 for whether a person, an animal, or another object is located behind the apparatus 12. The sensor 72 is connected to an electronic control unit 76 that is connected via a bus 78 to the electronic control unit 34 of the towing vehicle 10. The bus 78 can work according to the ISO 11783 standard. The engine controller 36, the actuators 38 and 40 can be connected to the control unit 34 by associated lines, as shown in the figures, or by the bus 70. Analogously, the sensor 72 could be connected to the control unit 68 by an associated line, as shown in the figures, or by the bus 70.

Advantageously, the electronic control units 34, 76 are used for the automatic control of the combination made from the towing vehicle 10 and the apparatus 12, e.g. for the automatic speed control of the towing vehicle 10 as a function of the rate at which harvested material is picked up and the actual bale size, and for automatically stopping and restarting the combination after finishing and ejecting a bale. For this purpose, reference is made to the disclosure of European Patent Document EP 1 813 146 A2, which is incorporated herein by reference.

In order to prevent the operator from leaving the cabin 20 and approaching the apparatus 12 in order to correct a problem, to convince himself of the functioning of the apparatus, or for other reasons while the drive shaft 64 is turning and the rollers 58, baling elements 56, belts 60, the rotor 52, and the material pick-up 50 are rotating or moving and to prevent the operator from being injured on moving parts of the apparatus 12, the control units 34, 68 are programmed such that when the sensor 72 reports to the control unit 76 of the apparatus 12 that a person, an animal, or an obstacle is located in the monitored danger zone 74, the control unit 76 of the apparatus 12 transmits an instruction to the control unit 34 of the towing vehicle 10 to move the actuator 38 into a position disconnecting the coupling 26. In this way, the PTO shaft 32 is stopped immediately, which also leads to the stopping of the driven elements (rollers 58, baling elements 56, belts 60, rotor 52, and material pick-up 50). In this case, it would also be conceivable to activate a PTO shaft brake (not shown) of the towing vehicle 10 by means of the control unit 34. If the PTO shaft 32 was not yet in operation at the time of the response of the sensor 72, the electronic control unit 34 of the towing vehicle 32 prevents the actuator 38 from closing the coupling 26. Furthermore, a warning that could be visual by means of a display device or a voice message is given to the operator. Alternatively or additionally, the control unit 76 could also disconnect a coupling (not shown) in the transmission 68, in order to stop the driven elements of the apparatus 12.

The control unit 76 informs the control unit 34 that the safety conditions have been re-established when the sensor 72 has reported to the control unit 68 that a person, animal, or obstacle is no longer located in the danger zone 74. The control unit 34 then orders the actuator 38 to close the coupling 26 advantageously only after the operator has pressed an activation button or has activated a PTO shaft switch.

In FIG. 2, the apparatus 12 is shown with a gate 62 raised for ejecting a finished bale 78. The sensor 72 is not mounted on the gate 62 and consequently does not pivot upward with it, but instead is connected rigidly to the chassis 42 by means of a bar 80. Consequently, it further monitors the danger zone 74 at the back of the apparatus 12. In this way it is prevented that the controller 76 causes a lowering of the rear gate 62 as long as the sensor 72 detects that a person, animal, or obstacle, e.g., a bale 78, is still located in the danger zone 74. Analogously, the gate 62 is raised for ejecting a bale 78 only when the sensor 72 detects no living creatures within the danger zone 74.

The size of the danger zone 74 is dimensioned such that, when the apparatus 12 and towing vehicle 10 are stopped, a large area is covered so that no person can touch moving parts on the rear side of the apparatus 12 without the driven elements of the apparatus 12 being deactivated automatically. When the apparatus is moving, the likelihood of action on the apparatus 12 is lower, so that the danger zone 74 can be reduced or the sensor 72 can be completely deactivated.

Having described the preferred embodiment, it will become apparent that various modifications can be made without departing from the scope of the invention as defined in the accompanying claims.

The invention claimed is:

1. A combination of an agricultural apparatus and a hauling or towing vehicle, the hauling or towing vehicle having a power take-off shaft that is selectively activated and deactivated by way of a coupling, the apparatus having drivable elements that are connected to the power take-off shaft, an electronic control unit of the apparatus connected via a bus to an electronic control unit of the hauling or towing vehicle, and the electronic control unit of the hauling or towing vehicle is connected to an external-power-activated actuator for activating and deactivating the coupling of the power take-off shaft wherein:

the electronic control unit of the apparatus is connected to a sensor for detecting a living creature present in a danger zone of the apparatus, the danger zone being monitored by the sensor depends on a speed of the combination and the danger zone being monitored by the sensor being smaller at a higher speed than at a lower speed; and, wherein in the case that a living creature located within the danger zone is detected by the sensor, the electronic control unit of the apparatus causes the electronic control unit of the hauling or towing vehicle to one of order the actuator to separate the coupling of the power take-off shaft and to prevent the actuator from closing the coupling.

2. The combination according to claim 1, wherein the apparatus is a round baler equipped with baling elements and in a rear gate of which the baling elements are freely accessible to the outside, and the sensor is allocated to the rear gate of the baler.

3. The combination according to claim 1, wherein after detecting a living creature within the danger zone, the electronic control unit of the hauling or towing vehicle is operated to order the actuator to close the coupling again only when the electronic control unit of the apparatus has reported to the electronic control unit of the hauling or towing vehicle that the sensor no longer detects a living creature within the danger zone and an operator has one of pressed an activation button and has activated a power take-off shaft switch.

4. The combination according to claim 1, wherein the sensor comprises one of an infrared sensor and a camera with an image-processing system.

5. The combination according to claim 2, wherein the control unit of the apparatus is operated to raise or lower the gate only when the sensor detects no living creatures in the danger zone.

* * * * *